United States Patent
Park et al.

(10) Patent No.: US 10,259,504 B2
(45) Date of Patent: Apr. 16, 2019

(54) REINFORCEMENT STRUCTURE OF SIDE-SILL FOR VEHICLE

(71) Applicants: Hyundai Motor Company, Seoul (KR); Kia Motors Corporation, Seoul (KR)

(72) Inventors: Cheol Han Park, Suwon-si (KR); Sung Gae Wee, Seongnam-si (KR); Dae Myoung Park, Suwon-si (KR); Hae Hoon Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/793,875

(22) Filed: Oct. 25, 2017

(65) Prior Publication Data

US 2019/0002027 A1 Jan. 3, 2019

(30) Foreign Application Priority Data

Jun. 29, 2017 (KR) .......................... 10-2017-0082229

(51) Int. Cl.
B62D 25/02 (2006.01)
(52) U.S. Cl.
CPC .................................. *B62D 25/025* (2013.01)
(58) Field of Classification Search
CPC ... B62D 25/025; B62D 25/04; B62D 25/2036
USPC ............ 296/209, 29, 203.03, 187.12, 193.05
See application file for complete search history.

(56) References Cited

U.S. PATENT DOCUMENTS

| 9,981,695 | B2 * | 5/2018 | Sunohara | B62D 25/2036 |
| 2002/0043821 | A1 * | 4/2002 | Takashina | B62D 21/157 |
| | | | | 296/203.03 |
| 2013/0200650 | A1 * | 8/2013 | Matsuoka | B62D 21/155 |
| | | | | 296/187.1 |
| 2015/0008703 | A1 * | 1/2015 | Furusaki | B62D 21/152 |
| | | | | 296/187.08 |
| 2015/0175213 | A1 * | 6/2015 | Chai | B62D 25/08 |
| | | | | 296/187.09 |
| 2016/0194032 | A1 * | 7/2016 | Yamamoto | B62D 25/025 |
| | | | | 296/193.05 |
| 2017/0313357 | A1 * | 11/2017 | Narahara | B62D 25/025 |
| 2017/0313358 | A1 * | 11/2017 | Narahara | B62D 25/04 |
| 2017/0313359 | A1 * | 11/2017 | Narahara | B62D 25/025 |

FOREIGN PATENT DOCUMENTS

KR 10-1996-0011543 B1 8/1996
KR 10-1997-0001054 A 1/1997

* cited by examiner

*Primary Examiner* — Gregory A Blankenship
(74) *Attorney, Agent, or Firm* — Morgan, Lewis & Bockius LLP

(57) ABSTRACT

A reinforcement structure of a side sill for a vehicle may include a side internal panel disposed within a vehicle body; a side sill reinforcement attached to the external surface of the side internal panel and forming a sill space; and a side sill extension closing the opening portion open to the front of the sill space formed by the side internal panel and the side sill reinforcement and being coupled to the side internal panel, the side sill reinforcement and a side sill reinforcing member, respectively.

7 Claims, 5 Drawing Sheets

REINFORCEMENT STRUCTURE OF SIDE-SILL FOR VEHICLE

CROSS-REFERENCE TO RELATED APPLICATION

The present application claims priority to Korean Patent Application No. 10-2017-0082229 filed on Jun. 29, 2017, the entire contents of which is incorporated herein for all purposes by this reference.

BACKGROUND OF THE INVENTION

Field of the Invention

The present invention relates to a reinforcement structure of a side sill for a vehicle which maintains the frame of a vehicle body at the lower side of a vehicle door and bears the load in the longitudinal direction and the vertical direction applied to the vehicle.

Description of Related Art

Generally, a side sill is one of the strength members constituting the side opening of the vehicle and placed under the vehicle door. The side sill is preferably not so high for the elevating rigidity. If the height of the side sill is set to a low value, the side sill may be damaged by coming into contact with obstacles on the ground. Therefore, the side sill must have proper dimensions while maintaining the cross-sectional area for securing the required rigidity.

The side sill is provided by combining an inner panel connected to a center floor panel mounted on the vehicle and an outer panel through welding or the like to form an internal space (sill space).

In order to efficiently use the internal space formed in the side sill, the internal space of the side sill has been mostly utilized to absorb the impact applied from the outside of the vehicle and to increase the deformation strength.

In other words, the inner portion of the side sill has low deformation strength due to its easy squeezing as the side sill space is empty, so the reinforcement member is inserted into the side sill space to protect the occupant and vehicle from impact.

Attempts to efficiently use the empty space and to absorb the external impact caused by the vehicle collision by inserting the reinforcement member into the internal space of the side sill have been steadily continued. It should be, however, noted that the actual vehicle collision situation is most similar to the small overlap collision situation.

Because the driver reflexively turns the vehicle handle when he or she feels a collision risk, the actual collision is most likely to occur partly frontal or side collisions, rather than in full frontal collisions.

In response to the present situation, vehicle manufacturers have implemented a small overlap frontal crash test.

In other words, it is a test to evaluate the safety by making the 25% area of the front portion of the vehicle running at a speed of 64 km/h hit the barrier of about 1.5 m height.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a reinforcement structure of a side sill for a vehicle configured for improving the collision performance of a vehicle by preventing the side sill from breaking and widening in a forward or rearward collision test, particularly a small overlap collision test.

A reinforcement structure of a side sill for a vehicle according to an exemplary embodiment of the present invention may include a side internal panel disposed within a vehicle body, a side sill reinforcement attached to the external surface of the side internal panel and forming a sill space, and a side sill extension closing the opening portion open to the front of the sill space formed by the side internal panel and the side sill reinforcement and being coupled to the side internal panel, the side sill reinforcement and a side sill reinforcing member, respectively.

The side sill reinforcing member may be disposed on the inside upper portion of the sill space to connect the side internal panel and the side sill reinforcement, and the side sill extension may be coupled to the side sill reinforcing member.

An integrated reinforcement which is disposed outside the side sill reinforcement may be further included. One side portion of the integrated reinforcement may be coupled to the side sill reinforcement, and a lower end portion the integrated reinforcement may be coupled to the side sill reinforcement and the side internal panel through a joining portion.

A side external panel of which a lower end portion is disposed on the external surface of the integrated reinforcement may be further included. The side external panel may be coupled to the integrated reinforcement and the side sill reinforcement through a joining portion.

A fender coupling bolt which sequentially penetrates and bolts the integrated reinforcement, the side sill reinforcement and an inserting portion of the side sill extension and which is connected to a fender, may be included.

The side sill reinforcing member may include a first member corresponding to the external surface of the side internal panel and being coupled to the side internal panel, a second member being bent with the first member integrally, corresponding to the internal upper surface of the sill space at the side sill reinforcement and being coupled to the side sill reinforcement, and a third member being bent with the second member integrally, corresponding to the internal external surface of the sill space at the side sill reinforcement and being coupled to the side sill reinforcement.

A front reinforcing member which is disposed to the front side of the side sill extension and connects the integrated reinforcement and the side internal panel, may be include.

The front reinforcing member may include a first front member coupled to the external surface of the integrated reinforcement, and a second front member being integrally bent at the first front member, covering the upper portion of the front portion of the side sill extension and being coupled to the side internal panel at the internal side of the second front member.

According to an exemplary embodiment of the present invention, the inserting portion of the side sill extension is coupled to the internal surface of the sill space inside the side sill through a joining portion, preventing breakage and spreading of the side sill during a collision.

Furthermore, the front reinforcing member covers the opening portion between the side internal pane and the integrated reinforcement, reinforces the coupling structure between the side internal panel and the integrated reinforcement and the coupling structure of the side sill extension, preventing breakage and spreading of the side sill during a collision.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
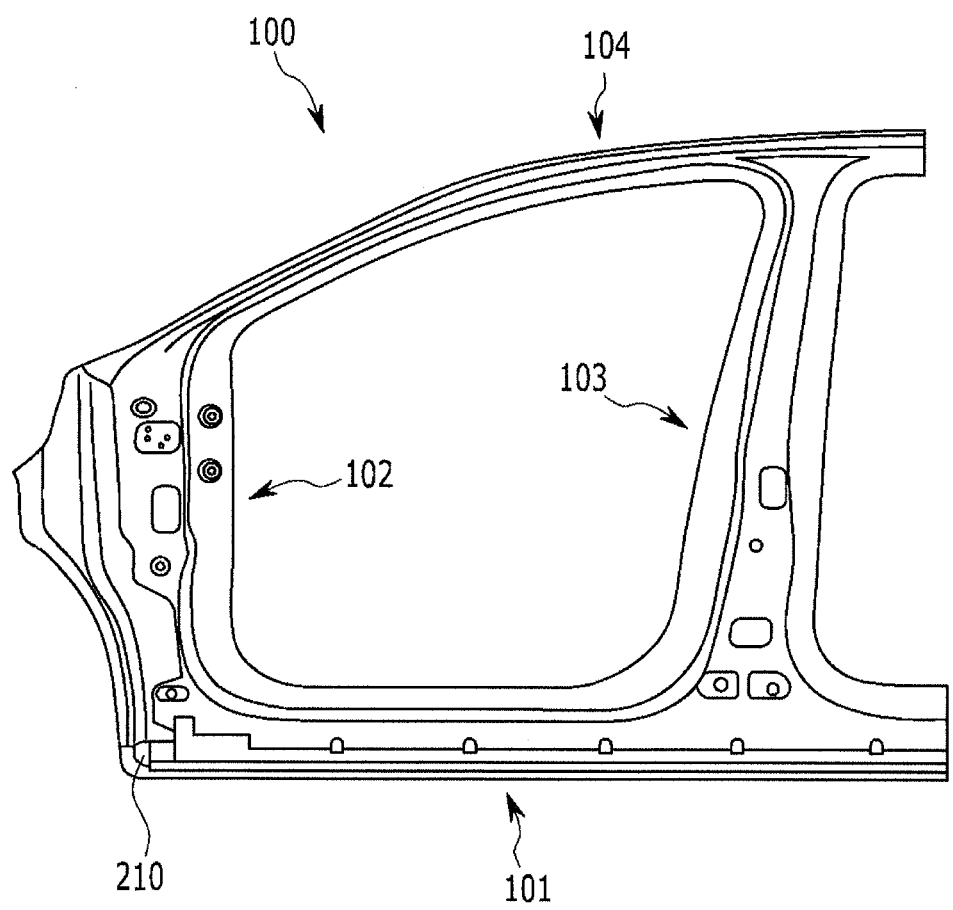
FIG. 1 is a side view of the integral hot stamping reinforcement forming the side sill for a vehicle associated with the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments, On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to accompanying drawings.

In an exemplary embodiment of the present invention, the reference numeral and shape described in the drawing is shown to implement the idea of the invention and may be different from the actual product.

The term used in the specification is used to describe the idea of the invention and may include content different from the meaning of the term itself.

However, since the size and thickness of each element shown in the drawing are arbitrarily shown for convenience of explanation, the present invention is not necessarily limited to that shown in the drawing, and the thickness is enlarged to clearly represent the various parts and regions.

To clearly illustrate an exemplary embodiment of the present invention, the parts not related to the description are omitted, and the same reference element is assigned to the same or similar constituent elements throughout the specification.

In the following description, to distinguish the names of the elements into first, second, and the like is to distinguish these because the names of the elements are the same, and it is not necessarily limited to the order.

FIG. 1 is a side view of the integral hot stamping reinforcement forming the side sill for a vehicle associated with the present invention.

Referring to FIG. 1, a vehicle body 100 may include a side sill 101, a front pillar 102, a center pillar 103, and a roof side rail 104, and a side sill extension 210 is disposed to the front side of the side sill 101.

The front structure of the side sill 101 where the side sill extension 210 is disposed will be described in detail with reference to FIGS. 2 to 5.

Figure 2:
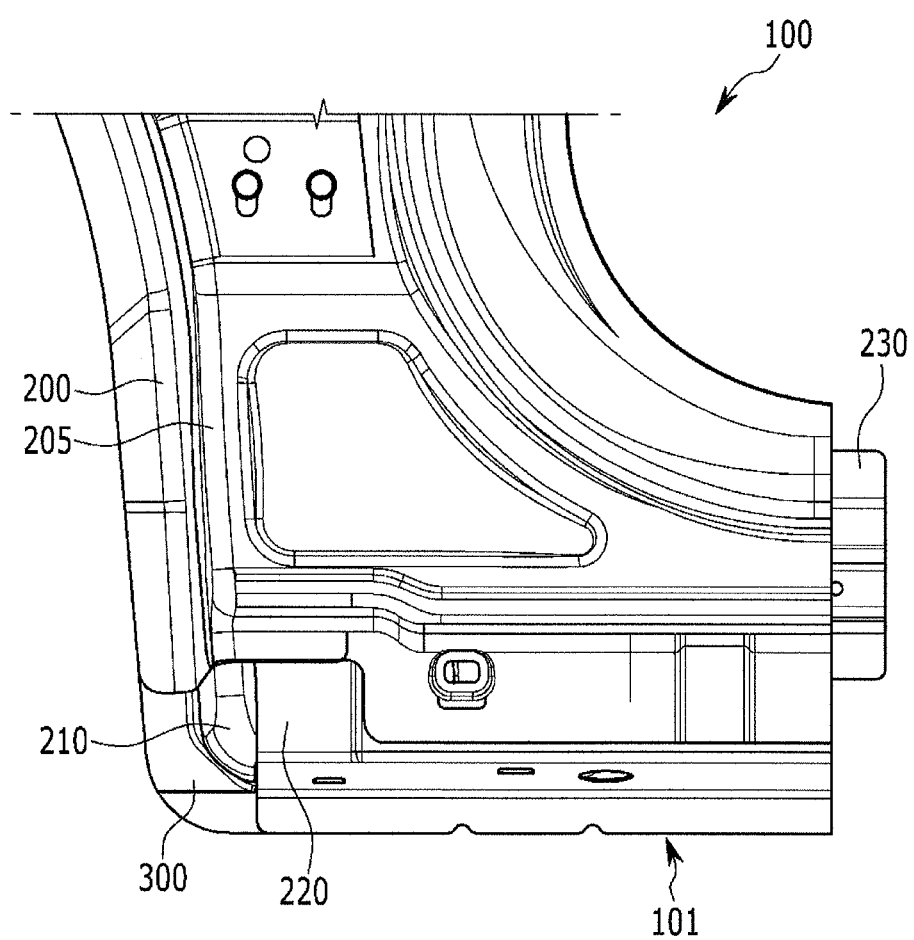
FIG. 2 is a partial side view of the front side of a side sill for a vehicle according to an exemplary embodiment of the present invention.
Figure 3:
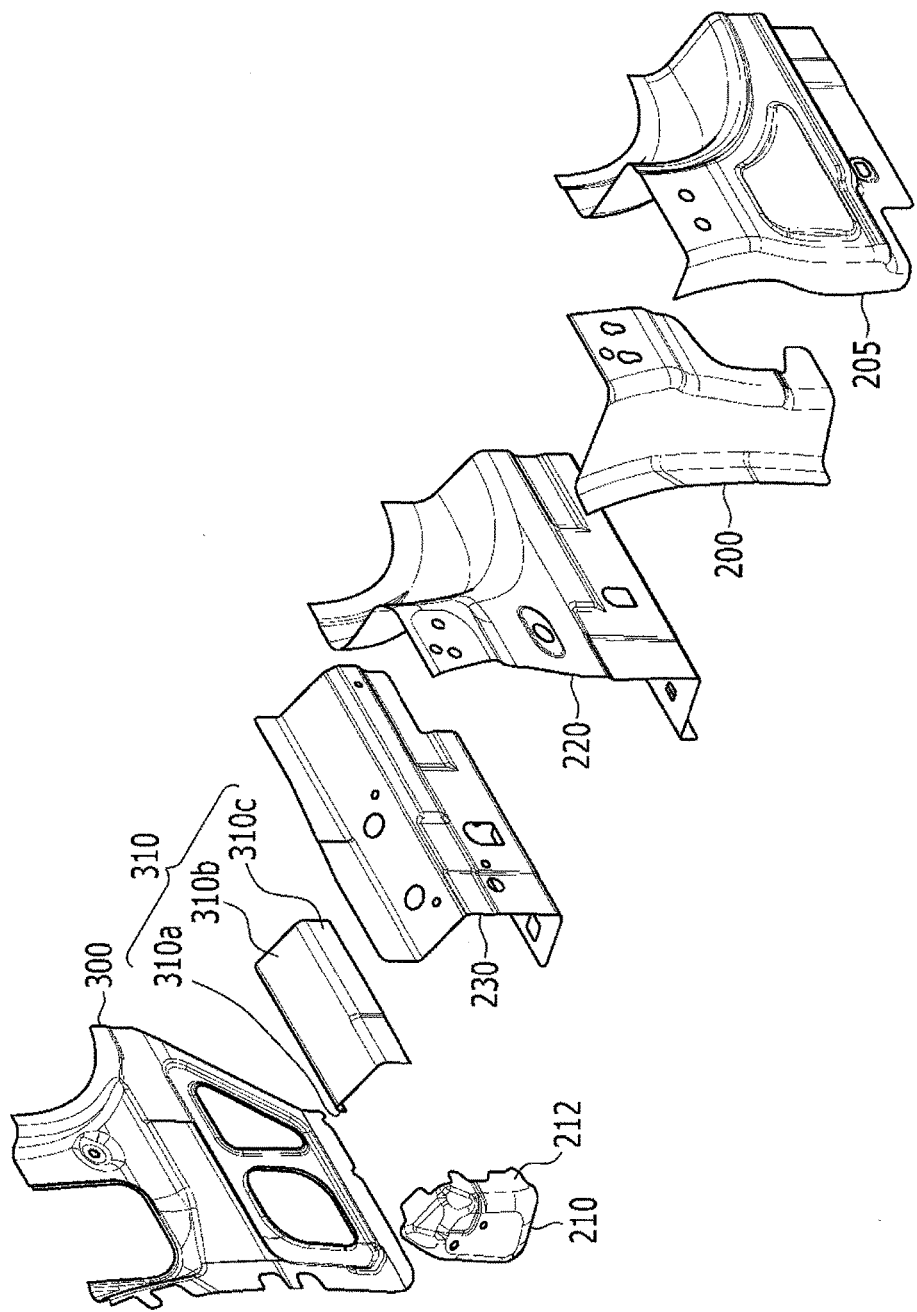
FIG. 3 is a partial exploded perspective view of the front side of a side sill for a vehicle according to an exemplary embodiment of the present invention.

FIG. 2 is a partial side view of the front side of a side sill for a vehicle according to an exemplary embodiment of the present invention and FIG. 3 is a partial exploded perspective view of the front side of a side sill for a vehicle according to an exemplary embodiment of the present invention.

Referring to FIG. 2 and FIG. 3, a side sill 101 for a vehicle may include a side internal panel 300, a front reinforcing member 200, a side sill extension 210, a side sill reinforcing member 310, a side sill reinforcement 230, an integrated reinforcement 220 and a side external panel 205.

The integrated reinforcement 220 may integrally formed 104 by a single plate material in accordance with the side sill 101, the front pillar 102, the center pillar 103 and the roof side rail. The integrated reinforcement 220 may be manufactured through a hot stamping process in which the plate material is heated to a predetermined temperature, formed into a mold, and quenched.

In the exemplary embodiment of the present invention, the side internal panel 300 may be relatively disposed on the internal to the vehicle body 100, and the side sill reinforcing member 310, the side sill reinforcement 230, the integrated reinforcement 220, the front reinforcing member 200 and the side external panel 205 are disposed sequentially the outside the side internal panel 300.

In this regard, the dispose order may vary depending on the joining method and the joining position, etc.

The side sill extension 210 may include an inserting portion 212 inserted into a sill space (FIG. 4, 405), and covers a front opening portion of the sill space 405 formed by the side internal panel 300, the side sill reinforcement 230, and the side sill reinforcement member 310.

In the exemplary embodiment of the present invention, the side sill reinforcement member 310 may include a first member 310a, a second member 310b and a third member 310c. The first member 310a may be coupled to the external surface of the side internal panel 300, the second member 310b may be coupled to the side sill reinforcement 230, and the third member 310c may be coupled to the internal side of the side sill reinforcement 230. The first, second and third members 310a, b, and c may be formed by integrally bending one plate member.

Figure 4:
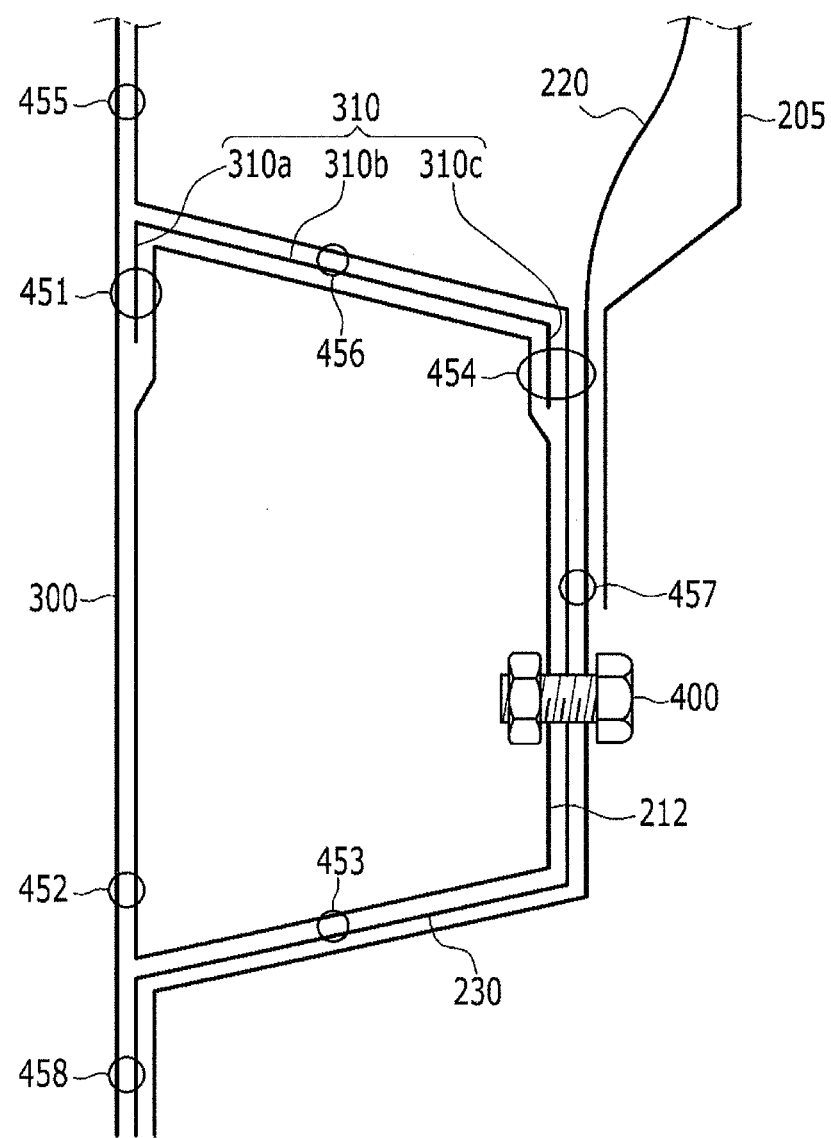
FIG. 4 is a cross-sectional view showing the welding portion of the front side of a side sill for a vehicle side according to an exemplary embodiment of the present invention.

FIG. 4 is a cross-sectional view showing the welding portion of the front side of a side sill for a vehicle side according to an exemplary embodiment of the present invention.

Referring to FIG. 4, a front portion of the side sill 101 as major joining portion may include a first joining portion 451, a second joining portion 452, a third joining portion 453, a fourth joining portion 454, a fifth joining portion 455, a sixth joining 456, a seventh joining 457 and an eighth joining 458.

The first joining portion 451 couples the side internal panel 300, the first member 310a of the side sill reinforcing member 310 and the inserting portion 212 of the side sill extension 210 together.

The second joining portion 452 couples the side internal panel 300 and the inserting portion 212 of the side sill extension 210, the third joining portion 453 couples the side sill reinforcement 230 and the inserting portion 212 of the side sill extension 210.

The fourth joining portion 454 couples the integrated reinforcement 220, the side sill reinforcement 230, the third member 310c of the side sill reinforcing member 310 and the third member 310c of the side sill extension 210 together.

The fifth joining portion 455 couples the side internal panel 300 and the side sill reinforcement 230, and the sixth joining portion 456 couples the inserting portion 212 of the side sill extension 210 and the side sill reinforcement 230.

The seventh joining portion 457 couples the side sill reinforcement 230, the integrated reinforcement 220 and the side external panel 205 together, and the eighth joining portion 458 couples the side internal panel 300, the side sill reinforcement 230 and the integrated reinforcement 220 together.

A fender coupling bolt 400 passes through the inserting portion 212 of the side sill extension 210, the side sill reinforcement 230 and the integrated reinforcement 220 to be fasten with a nut, so that the side sill extension 210, the side sill reinforcement 230 and the integrated reinforcement 220 are securely couple to each other. The fender coupling bolt 400 may be connected to a fender.

In the present regard, the coupling structure between the fender coupling bolt 400 and the fender is referred to a known technology, and a detailed description thereof will be omitted.

In the exemplary embodiment of the present invention, the position of the first, second, third, fourth, fifth, sixth, seventh, eighth joining portion 451-458 and the fender coupling bolt 400 may be varied depending on the design specification, and holes for spot welding may be formed at predetermined positions in advance.

In addition, the shape and position of the hole for spot welding is obvious to a person of an ordinary skill in the art, so a detailed description thereof is omitted.

Figure 5:
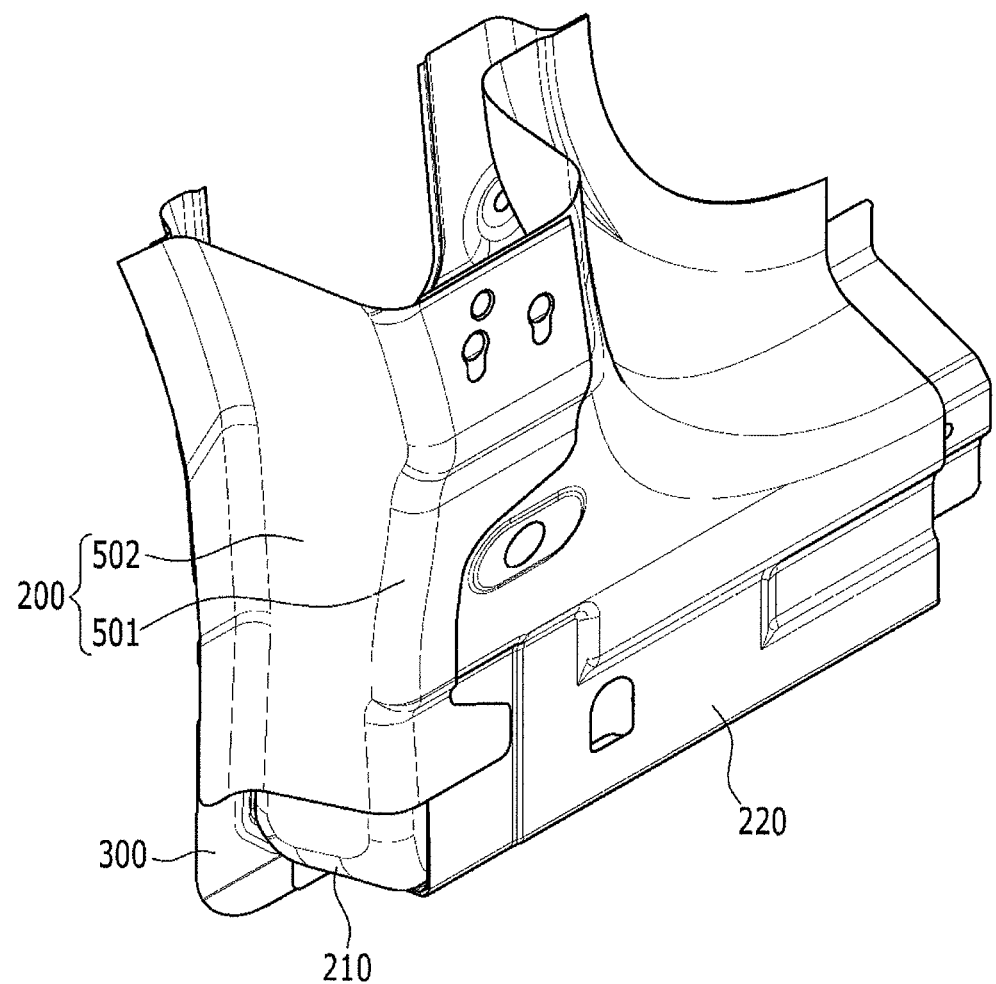
FIG. 5 is a partial perspective view of the front side of a side sill for a vehicle according to an exemplary embodiment of the present invention.

FIG. 5 is a partial perspective view of the front side of a side sill for a vehicle according to an exemplary embodiment of the present invention.

Referring to FIG. 5, the front reinforcing member 200 may include a first front member 501 and a second front member 502, and the first, two front members 501 and 502 are integrally formed by bending a single sheet material.

The first front member 501 may be coupled to the external surface of the integrated reinforcement 220 and the second front member 502 may be integrally bent at the first front member 501 to form a front opening portion formed between the integrated reinforcement 220 and the side internal panel 300. The internal side of the second front member 502 is coupled to the external surface of the side internal panel 300.

The side sill extension 210 closes the sill space 405 formed between the side sill reinforcement 230 and the side internal panel 300. The second front member 502 covers the upper side of the front side of the side sill extension 210, reinforcing the structure of the side sill extension 210 and connecting the front surfaces between the integrated reinforcement 220 and the side internal panel 300 to each other to strengthen their joining structure.

In the exemplary embodiment of the present invention, the side sill extension 210 is coupled to the internal surface of the sill space 405 of the side sill through the respective joint portions to effectively prevent the front side of the side sill 101 from breaking and spreading.

Furthermore, the front reinforcing member 200 also covers the front opening portion between the side internal panel 300 and the integrated reinforcement 220, reinforces the coupling structure between the side internal panel 300 and the integrated reinforcement 220, and strengthen the coupling structure of the side sill extension 210, effectively preventing the front portion of the side sill from breaking and widening in the event of a collision.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the claims appended hereto and their equivalents.

What is claimed is:

1. A reinforcement structure of a side sill for a vehicle comprising:
   a side internal panel disposed within a vehicle body;
   a side sill reinforcement attached to an external surface of the side internal panel and forming a sill space; and
   a side sill extension closing an opening portion open to a front of the sill space formed by the side internal panel and the side sill reinforcement and being coupled to the side internal panel, the side sill reinforcement and a side sill reinforcing member, respectively,
   wherein the side sill reinforcing member is disposed on an inside upper portion of the sill space to connect the side internal panel and the side sill reinforcement, and
   wherein the side sill extension is coupled to the side sill reinforcing member.

2. The reinforcement structure of the side sill for the vehicle of claim 1, further including:
   an integrated reinforcement of which one side portion is coupled to the side sill reinforcement and a lower end portion is coupled to the side sill reinforcement and the side internal panel through a joining portion, disposed outside the side sill reinforcement.

3. The reinforcement structure of the side sill for the vehicle of claim 2, further including:
   a side external panel of which a lower end portion is disposed on an external surface of the integrated reinforcement, coupled to the integrated reinforcement and the side sill reinforcement through a joining portion.

4. The reinforcement structure of the side sill for the vehicle of claim 2, further including:

a fender coupling bolt which sequentially penetrates and bolts the integrated reinforcement, the side sill reinforcement and an inserting portion of the side sill extension and which is connected to a fender.

5. The reinforcement structure of the side sill for the vehicle of claim 1, wherein the side sill reinforcing member includes:
   a first member corresponding to the external surface of the side internal panel and being coupled to the side internal panel,
   a second member bent with the first member integrally, corresponding to an internal upper surface of the sill space at the side sill reinforcement and coupled to the side sill reinforcement, and
   a third member bent with the second member integrally, corresponding to the internal external surface of the sill space at the side sill reinforcement and coupled to the side sill reinforcement.

6. The reinforcement structure of the side sill for the vehicle of claim 2, further including:
   a front reinforcing member which is disposed to a front side of the side sill extension and connects the integrated reinforcement and the side internal panel.

7. The reinforcement structure of the side sill for the vehicle of claim 6, wherein the front reinforcing member includes:
   a first front member coupled to the external surface of the integrated reinforcement; and
   a second front member being integrally bent at the first front member, covering an upper portion of a front portion of the side sill extension and being coupled to the side internal panel at an internal side of the second front member.

* * * * *